US012722492B2

(12) United States Patent
Kim et al.

(10) Patent No.: US 12,722,492 B2
(45) Date of Patent: Sep. 1, 2026

(54) DISPLAY DEVICE FOR VEHICLE

(71) Applicant: LG ELECTRONICS INC., Seoul (KR)

(72) Inventors: Byungkyu Kim, Seoul (KR); Hansoo Kim, Seoul (KR); Byunglok Jeon, Seoul (KR); Inkoo Shim, Seoul (KR); Romain Diboine, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/846,939

(22) PCT Filed: Mar. 14, 2022

(86) PCT No.: PCT/KR2022/003529

§ 371 (c)(1), (2) Date: Sep. 13, 2024

(87) PCT Pub. No.: WO2023/176988

PCT Pub. Date: Sep. 21, 2023

(65) Prior Publication Data

US 2025/0206134 A1 Jun. 26, 2025

(51) Int. Cl.
*B60K 35/60* (2024.01)
*B60K 35/22* (2024.01)
(Continued)

(52) U.S. Cl.
CPC .............. *B60K 35/60* (2024.01); *B60K 35/22* (2024.01); *B60K 35/231* (2024.01); *B60K 35/53* (2024.01);
(Continued)

(58) Field of Classification Search
None
See application file for complete search history.

(56) References Cited

U.S. PATENT DOCUMENTS 7,826,934 B1 11/2010 Schowalter
2016/0355091 A1* 12/2016 Lee ..................... B60R 11/0229
(Continued)

FOREIGN PATENT DOCUMENTS

CN 113561774 A 10/2021
EP 3 282 166 A1 2/2018
(Continued)

*Primary Examiner* — Stephen T. Reed
(74) *Attorney, Agent, or Firm* — Birch, Stewart, Kolasch & Birch, LLP

(57) ABSTRACT

A display device for a vehicle is disclosed. The display device for a vehicle includes a housing that is elongated, a display base that is elongated in a longitudinal direction of the housing and is pivotally coupled to the housing about a longitudinal axis of the housing, a display module coupled to the display base and being configured to rotate together with the display base, and a driving module located inside the housing and being configured to drive the display base to pivot, in which the display module includes a first display surface elongated in a longitudinal direction of the display base, and a second display surface elongated in the longitudinal direction of the display base, and being bent and extending from the first display surface, and in which a size of the second display surface is greater than a size of the first display surface.

18 Claims, 18 Drawing Sheets

(51) Int. Cl.

| | |
|---|---|
| ***B60K 35/231*** | (2024.01) |
| ***B60K 35/53*** | (2024.01) |
| ***B60K 35/81*** | (2024.01) |
| ***B60R 11/00*** | (2006.01) |

(52) U.S. Cl.
CPC ....... *B60K 35/81* (2024.01); *B60R 2011/0085* (2013.01); *B60R 2011/0092* (2013.01)

(56) References Cited

U.S. PATENT DOCUMENTS

| | | | |
|---|---|---|---|
| 2019/0337388 | A1 | 11/2019 | Hélot |
| 2021/0284021 | A1 | 9/2021 | Cheng |
| 2022/0144088 | A1 | 5/2022 | Tanaka et al. |

FOREIGN PATENT DOCUMENTS

| | | | |
|---|---|---|---|
| JP | 2012-113213 | A | 6/2012 |
| KR | 10-2016-0144008 | A | 12/2016 |
| KR | 10-2020-0106014 | A | 9/2020 |
| KR | 10-2021-0059106 | A | 5/2021 |
| WO | WO 2021/015088 | A1 | 1/2021 |

* cited by examiner

DISPLAY DEVICE FOR VEHICLE

CROSS REFERENCE TO RELATED APPLICATION

This application is the National Phase of PCT International Application No. PCT/KR2022/003529, filed on Mar. 14, 2022, all of which is hereby expressly incorporated by reference into the present application.

TECHNICAL FIELD

The present disclosure relates to a display device for a vehicle.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used. A display device using an organic light emitting diode (OLED) has excellent luminance and viewing angle characteristics compared to a liquid crystal display device, and requires no backlight unit, which is advantageous to achieve an ultra-thin profile.

A vehicle is a means of transportation, which is manually driven by a human driver. Information regarding the state or status of a vehicle is necessary for a driver to operate the vehicle, and the vehicle's status information can be delivered to the driver through an analog display device or a digital display in the vehicle. With the advancement of vehicle functions and performance, more information can be provided to drivers than ever before, and research is being conducted on displays to provide safe and space-efficient information due to the structural constraints of vehicles in terms of passenger safety and space limitation.

Autonomous or self-driving vehicles capable of moving without the intervention of a human driver have been under development for years. A driver or passenger in an autonomous vehicle can be provided with not only information necessary for the operation of the vehicle, but also work or convenience-related information. In-vehicle infotainment (IVI) is a system in which devices installed in a vehicle provides driving-related information, such as the vehicle status and navigation, as well as entertainment for users. In-car entertainment (ICE) refers to a system in cars that provides multimedia content for users.

Recently, numerous research has been conducted on such an in-vehicle display device.

DISCLOSURE

Technical Problem

It is an objective of the present disclosure to solve the above and other problems.

It is another objective of the present disclosure to provide a variable display device for a vehicle.

It is yet another objective of the present disclosure to provide a display device for a vehicle equipped with a variable mechanism.

It is yet another objective of the present disclosure to provide a display device for a vehicle that can be expanded to a large screen.

Technical Solution

According to an aspect of the subject matter described in this application, a display device for a vehicle includes: a housing that is elongated and defines an accommodation space therein; a display base that is elongated in a longitudinal direction of the housing and pivotally coupled to the housing about a longitudinal axis of the housing; a display module coupled to the display base so as to rotate together with the display base; and a driving module installed in the housing to cause the display base to pivot, wherein the display module includes: a first display surface that is elongated in a longitudinal direction of the display base; and a second display surface that is elongated in the longitudinal direction of the display base to be parallel with the first display surface, the second display surface being bent and extending from the first display surface.

Advantageous Effects

A display device for a vehicle according to the present disclosure has the following effects.

According to at least one of the embodiments of the present disclosure, it is possible to provide a variable display device for a vehicle.

According to at least one of the embodiments of the present disclosure, it is possible to provide a display device for a vehicle equipped with a variable mechanism.

According to at least one of the embodiments of the present disclosure, it is possible to provide a display device for a vehicle that is expandable to a large screen.

Further scope of applicability of the present disclosure will become apparent from the following detailed description. However, it should be understood that the detailed description and specific embodiments of the present disclosure are given by way of example only, since various changes and modifications within the idea and scope of the present disclosure may be clearly understood by those skilled in the art.

BRIEF DESCRIPTION OF DRAWINGS

FIGS. 1 to 18 illustrate examples of a display device for a vehicle according to embodiments of the present disclosure.

MODE FOR THE INVENTION

Figure 1:
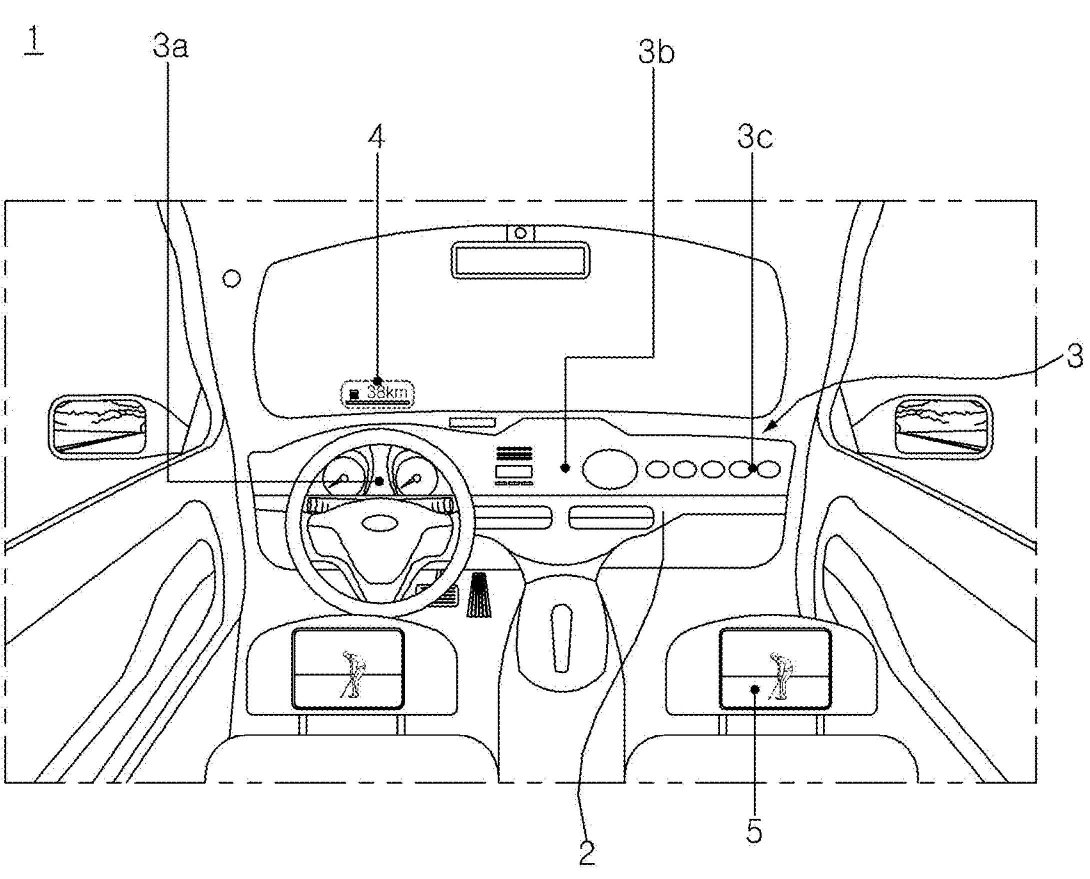

Description will now be given in detail according to embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and unit may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context dearly indicates otherwise.

In the following description, when an embodiment is described with reference to a specific figure, reference numeral not shown in the specific figure may be mentioned, if necessary or desired. However, the reference numeral not shown in the specific figure may be mentioned only when the reference numeral is shown in other figures.

Referring to FIG. 1, a display device may be installed in a cabin 1 of a vehicle. The display device may be referred to as an in-vehicle digital cockpit. A plurality of display devices may be installed in the cabin 1 of the vehicle.

A main display device 3 may be installed on a dashboard 2 of the vehicle. The main display device 3 may include a cluster 3*a*, a center information display (CID) 3*b*, and a co-driver display (CDD) 3*c*. The cluster 3*a* may provide information to a driver, the CDD 3*c* may provide information to a front seat passenger, and the CID 3*b* may provide information to an occupant.

A head-up display (HUD) 4 may be installed on the dashboard 2 to display information on a front windshield of the vehicle. The HUD 4 may provide information to the driver while the driver keeps his or her eyes on the road ahead.

A rear seat entertainment (RSE) 5 may be mounted on the rear of a driver's seat headrest and/or the rear of a passenger seat's headrest. The RSE 5 may provide information to a rear seat passenger.

Figure 2:
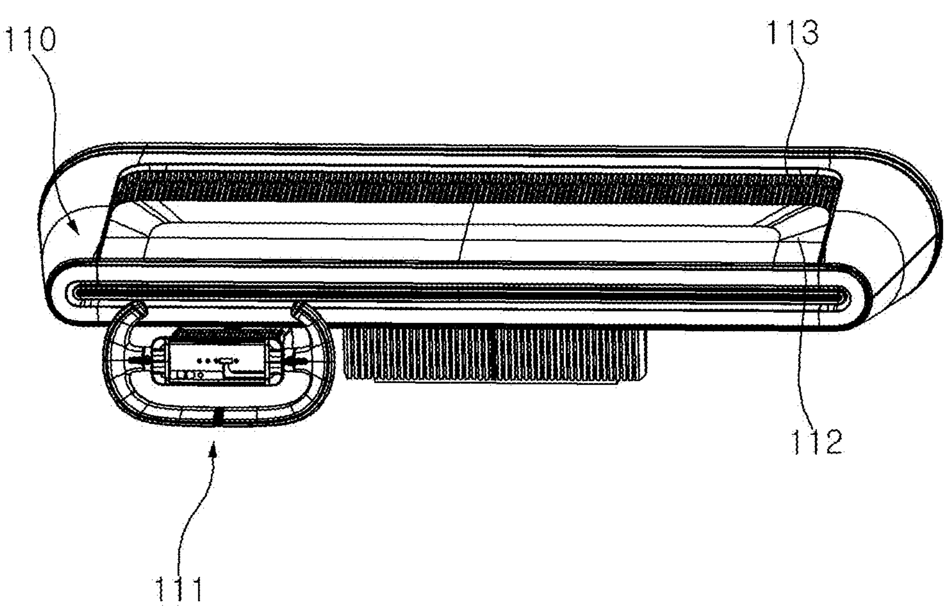
Figure 3:
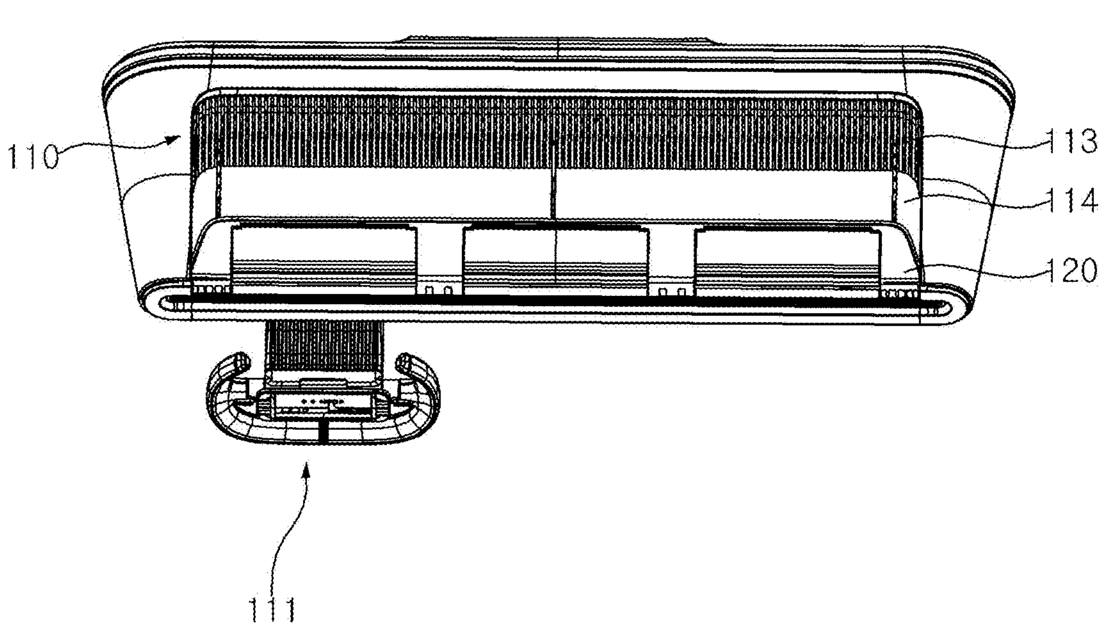

Referring to FIGS. 2 and 3, a dashboard 100 may be configured as a housing 110 elongated horizontally. A handle 111 may be coupled to one side of the housing 110. A heat dissipation outlet 113 may define a portion of an upper surface of the housing 110. Heat generated in the housing 110 may be released to the outside through the heat dissipation outlet 113.

A display mount 114 may be mounted on the upper surface of the housing 110. The display mount 114 may be disposed adjacent to the heat dissipation outlet 113. For example, the display mount 114 may be positioned close to the handle 111, and the heat dissipation outlet 113 may be disposed opposite the handle 111 with respect to the display mount 114.

A display base 120 may be rotatably coupled to the display mount 114. The display base 120 may be pivotally connected to the display mount 114 to rotate. A display cover 112 may cover the display mount 114 and the display base 120. The display cover 112 may be movable from the display base 120 to the heat dissipation outlet 113. When the display cover 112 moves from the display base 120 to the heat dissipation outlet 113, the display cover 112 may cover the heat dissipation outlet 113.

Figure 4:
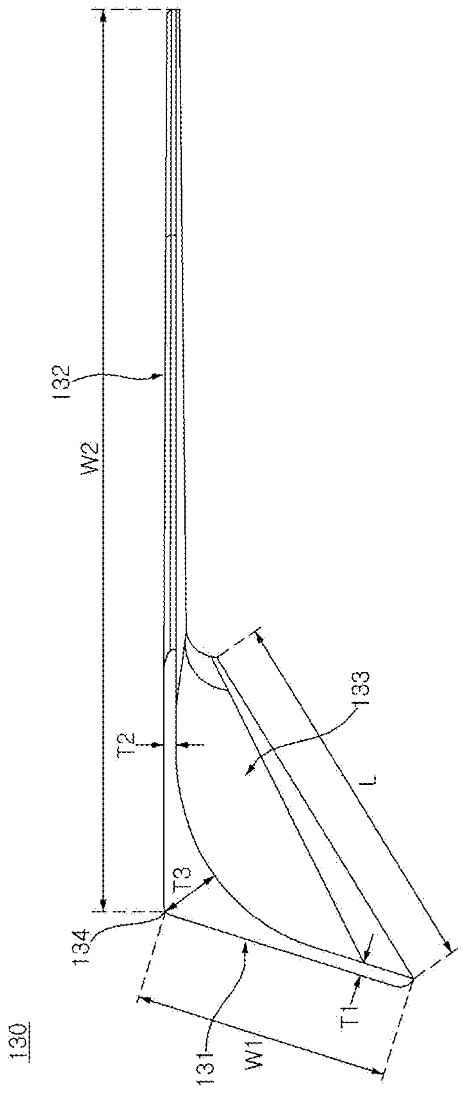
Figure 5:
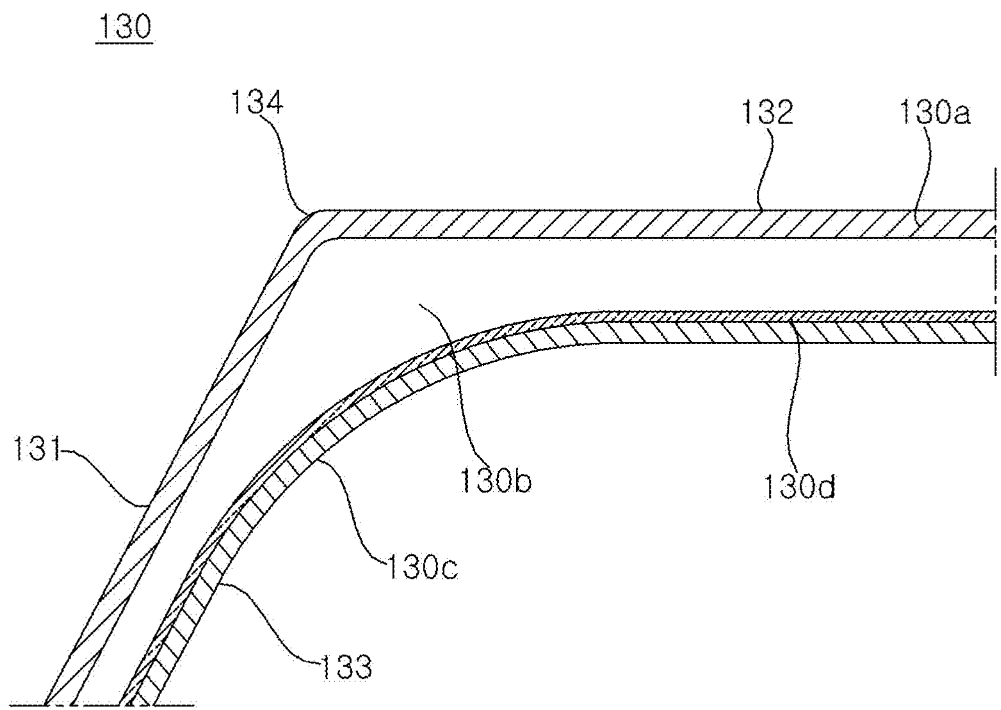

Referring to FIGS. 4 and 5, a display module 130 may be referred to as a first display module 130 or a first display 130. The display module 130 may be bent. The display module 130 may include a first surface 131, a second surface 132, and a third surface 133. The first surface 131 may be referred to as a first display surface 131, and the second surface 132 may be referred to as a second display surface 132.

The first surface 131 may define a portion of an outer surface of the display module 130, and the second surface 132 may be bent and extend from the first surface 131 so as to define a portion of the outer surface of the display module 130. The first surface 131 may be flat, and the second surface 132 may be flat. An edge 134 defined by the first surface 131 and the second surface 132 may be rounded.

The third surface 133 may face the first surface 131 and the second surface 132. The third surface 133 may include a flat surface and a curved surface. The third surface 133 may be parallel to the first surface 131 while being parallel to the second surface 132. The curved surface of the third surface 133 may be formed by connecting the first surface 131 and the second surface 132. A length L of the first surface 131 may be equal to a length L of the second surface 132. A width W1 of the first surface 131 may be less than a width W2 of the second surface 132. The width W2 of the second surface 132 may be 4 to 5 times the width W1 of the first surface 131.

A first thickness T1 defined by the flat surfaces of the first surface 131 and the third surface 133 may be substantially equal to a second thickness T2 defined by the flat surfaces of the second surface 132 and the third surface 133. A third thickness T3 defined by the rounded surface of the edge 134 and the curved surface of the third surface 133 may be greater than the first thickness T1 and/or the second thickness T2. Thus, it is possible to provide a three-dimensional image and information.

A substrate 130*a* may define the first surface 131, the second surface 132, and the rounded surface 134. For example, the substrate 130*a* may be glass. Bending processing is performed on the substrate 130*a* so that the rounded surface 134 may connect the first surface 131 and the second surface 132. For example, the second surface 132 may form an obtuse angle with the first surface 131. The first surface 131, the second surface 132, and the rounded surface 134 may be referred to as a front surface or an outer surface of the substrate 130*a*.

An intermediate layer 130*b* may be coupled or bonded to a rear surface or an inner surface of the substrate 130*a*. For example, the intermediate layer 130*b* may be a transparent resin layer.

A display panel 130*c* may be coupled or bonded to the intermediate layer 130*b*. For example, the display panel 130*c* may be POLED. An adhesive layer 130*d* may be disposed between the display panel 130*c* and the intermediate layer 130*b*. The adhesive layer 130*d* may fix the display panel 130*c* to the intermediate layer 130*b*. For example, the adhesive layer 130*d* may be an optically clear adhesive (OCA) layer.

Figure 6:
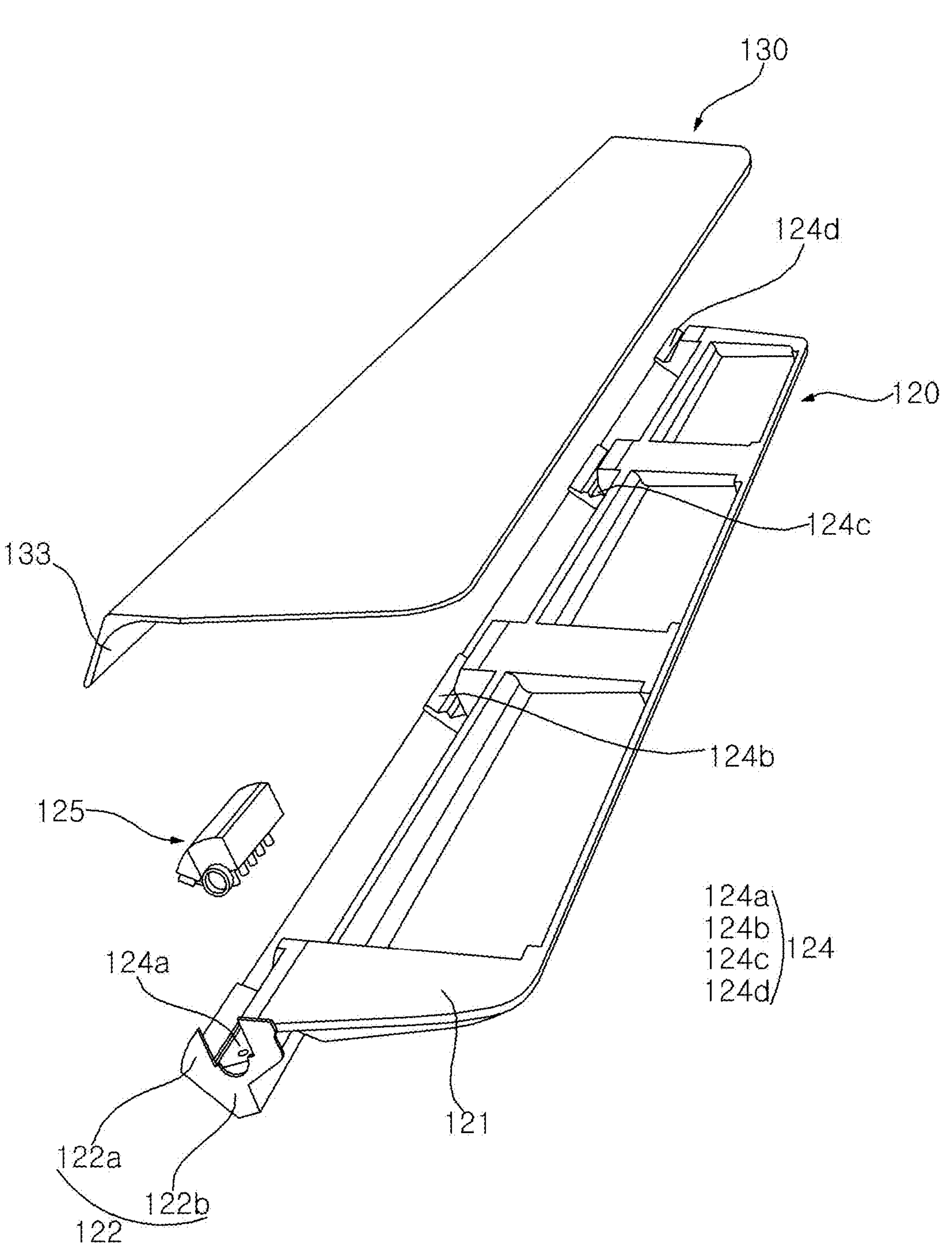
Figure 7:
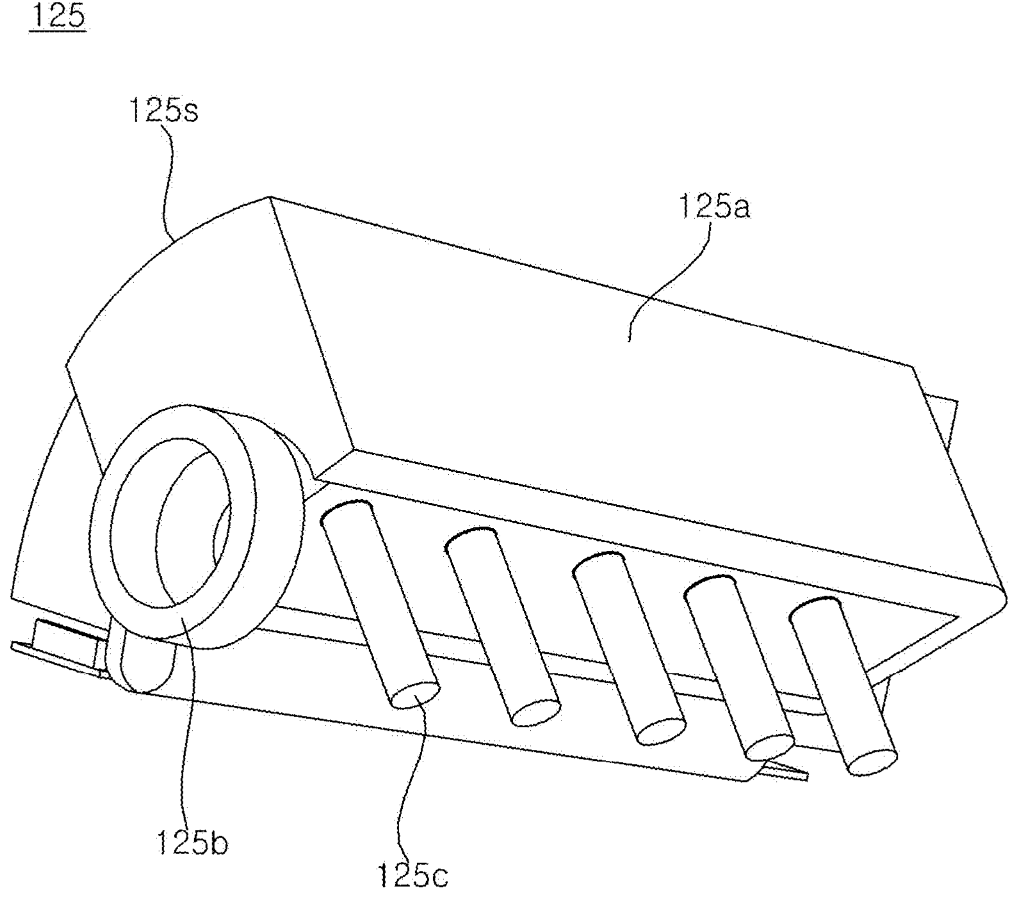
Figure 8:
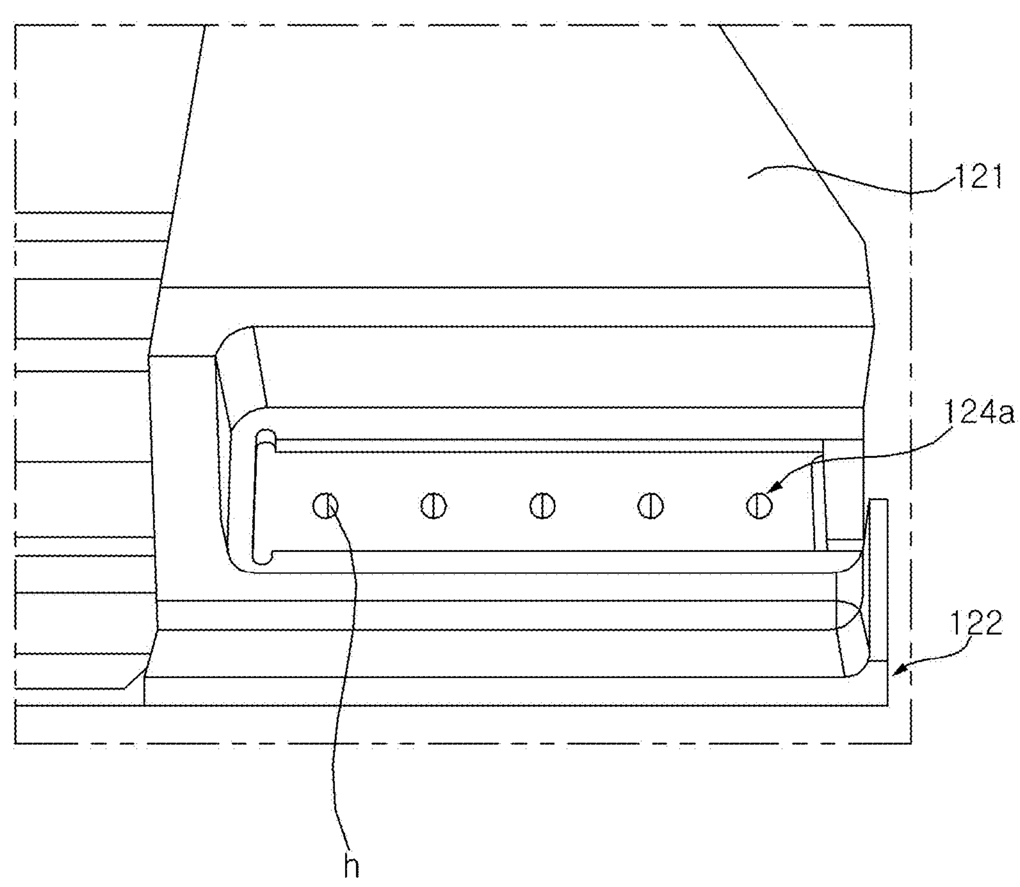

Referring to FIGS. 6 to 8, the display module 130 may be mounted on the display base 120. The display base 120 may support or contact the third surface 133 of the display module 130.

The base 120 may include a wing plate 121 and a shaft 122. The wing plate 121 may be an elongated plate. The shaft 122 may be elongated along a longitudinal direction of the wing plate 121, and may be formed on or fixed to a long side of the wing plate 121. When the shaft 122 rotates, the wing plate 121 may rotate together therewith. The wing plate 121 may rotate about the shaft 122.

The base 120 may include a block groove 124. The block groove 124 may be formed in the shaft 122 of the base 120. An outer surface of the shaft 122 of the base 120 may be recessed inward to form the block groove 124. For example, the block groove 124 may have the shape of a tub. Through-holes h may be formed in the bottom of the block groove 124. A plurality of block grooves 124 may be formed while being spaced a predetermined distance apart from the shaft 122 of the base 120.

A rotation block 125 may include a body 125*a*, a rotating shaft 125*b*, and a pin 125*c*. The body 125*a* may have the shape of an elongated polygonal prism, and may be inserted or press-fitted into the block groove 124. The rotation block 125 may correspond to the shape of the block groove 124. The pin 125*c* may be elongated from one side of the body 125*a*. The pin 125*c* may be provided in plurality. The pin 125*c* may be inserted into the through-hole h of the block groove 124*a*. The number of pins 125*c* may correspond to the number of through-holes h.

A curved surface 125*s* may define a side surface of the body 125*a* along a longitudinal direction of the body 125*a*. The curved surface 125*s* of the body 125*a* may correspond to the curved surface of the third surface 133 of the display module 130. The curved surface 125*s* of the body 125*a* may have a curvature that corresponds to a curvature of the third surface 133 of the display module 130.

Figure 9:
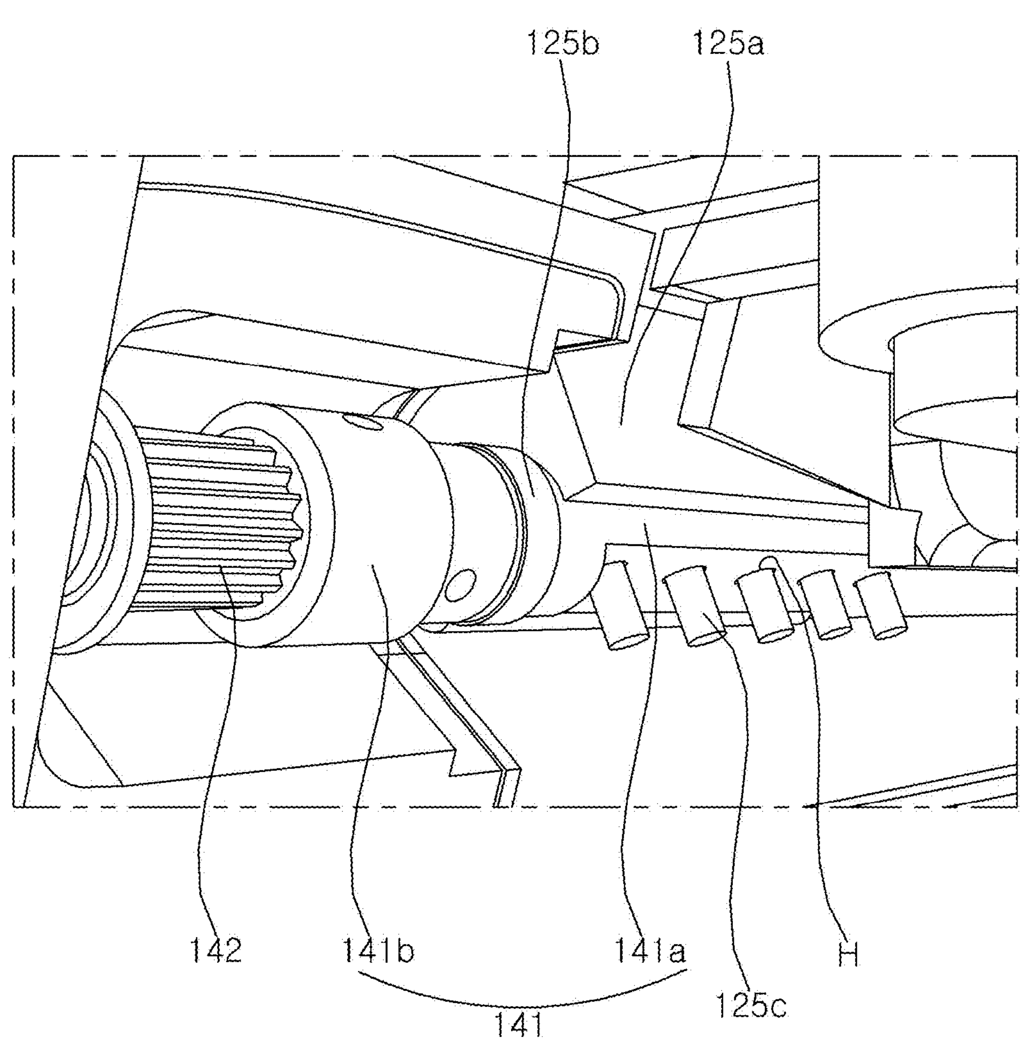
Figure 10:
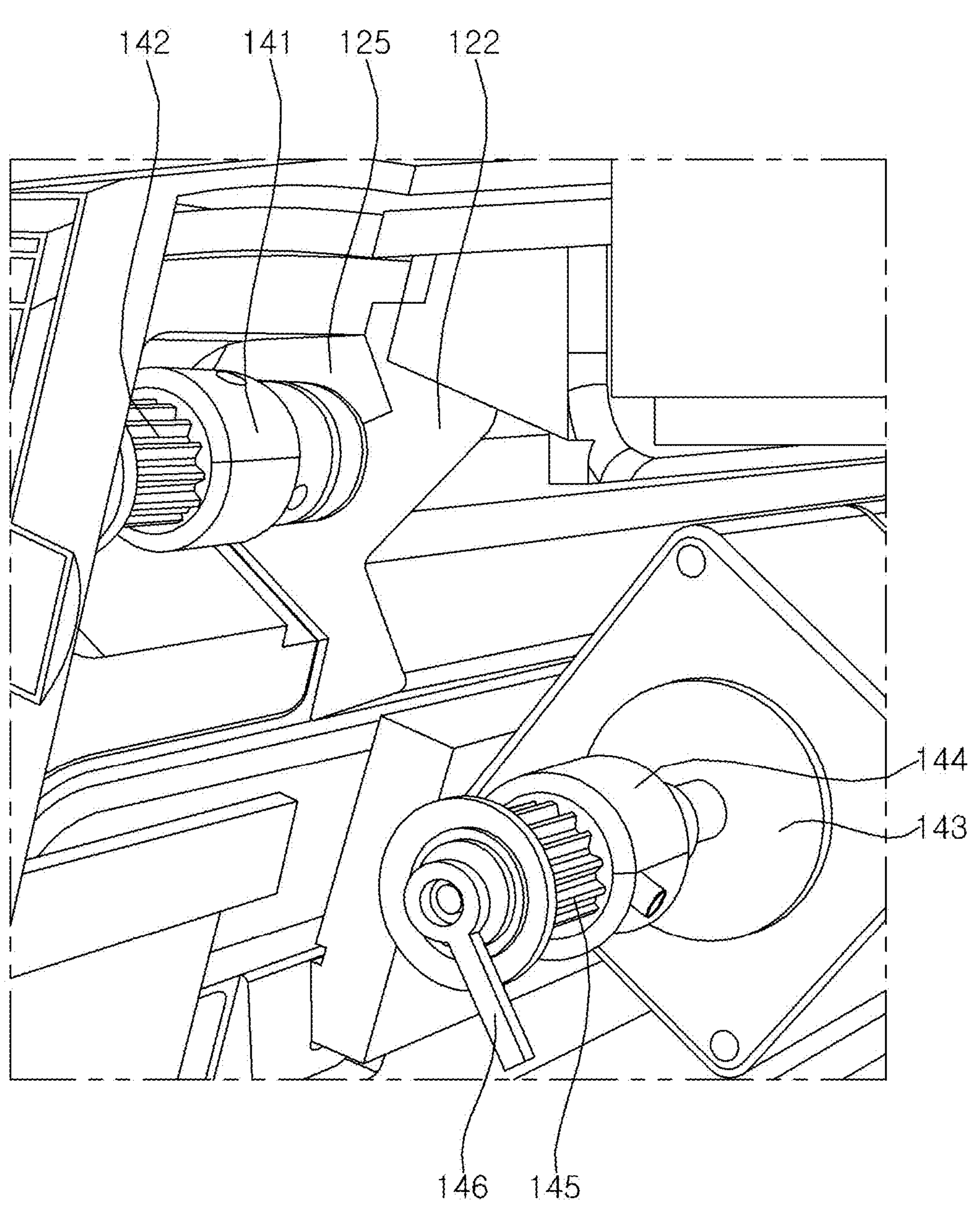

Referring to FIGS. 9 and 10, a driving module may include a pulley (141, 142, 144, 145) and a motor 143.

The pulley (141, 142) may include a pulley shaft 141 and a pulley gear 142. The pulley gear 142 may be fixed to the pulley shaft 141. When the pulley gear 142 rotates, the pulley shaft 141 may rotate together with the pulley gear 142. The pulley shaft 141 may be coupled to the rotating shaft 125*b* of the rotation block 125.

The pulley shaft 141 may include an outer shaft 141*b* and an inner shaft 141*a*. The inner shaft 141*a* may have an aperture H into which the pin 125*c* is inserted. The pin 125*c* of the rotation block 125 may be inserted into the aperture H of the pulley shaft 141. Accordingly, the pulley gear 142 and the pulley shaft 141 may rotate together with the rotation block 125. The pulley (141, 142) may be referred to as a transmission pulley (141, 142).

The motor 143 may be positioned adjacent to the rotation block 125 and/or the shaft 122 of the base 120. A pulley shaft 144 may be fixed to a rotating shaft of the motor 143. A pulley gear 145 may be coupled or fixed to the pulley shaft 144. Therefore, when the rotating shaft of the motor 143 rotates, the pulley shaft 144 and the pulley gear 145 may rotate together therewith. An indicator 146 may be coupled to a rotation center of the pulley gear 145. The indicator 146 may be elongated in a radial direction of the pulley gear 145. When the pulley gear 145 rotates, the indicator 146 may rotate clockwise or counterclockwise with respect to the rotation center of the pulley gear 145. The pulley (144, 145) may be referred to as a driving pulley (144, 145).

Figure 11:
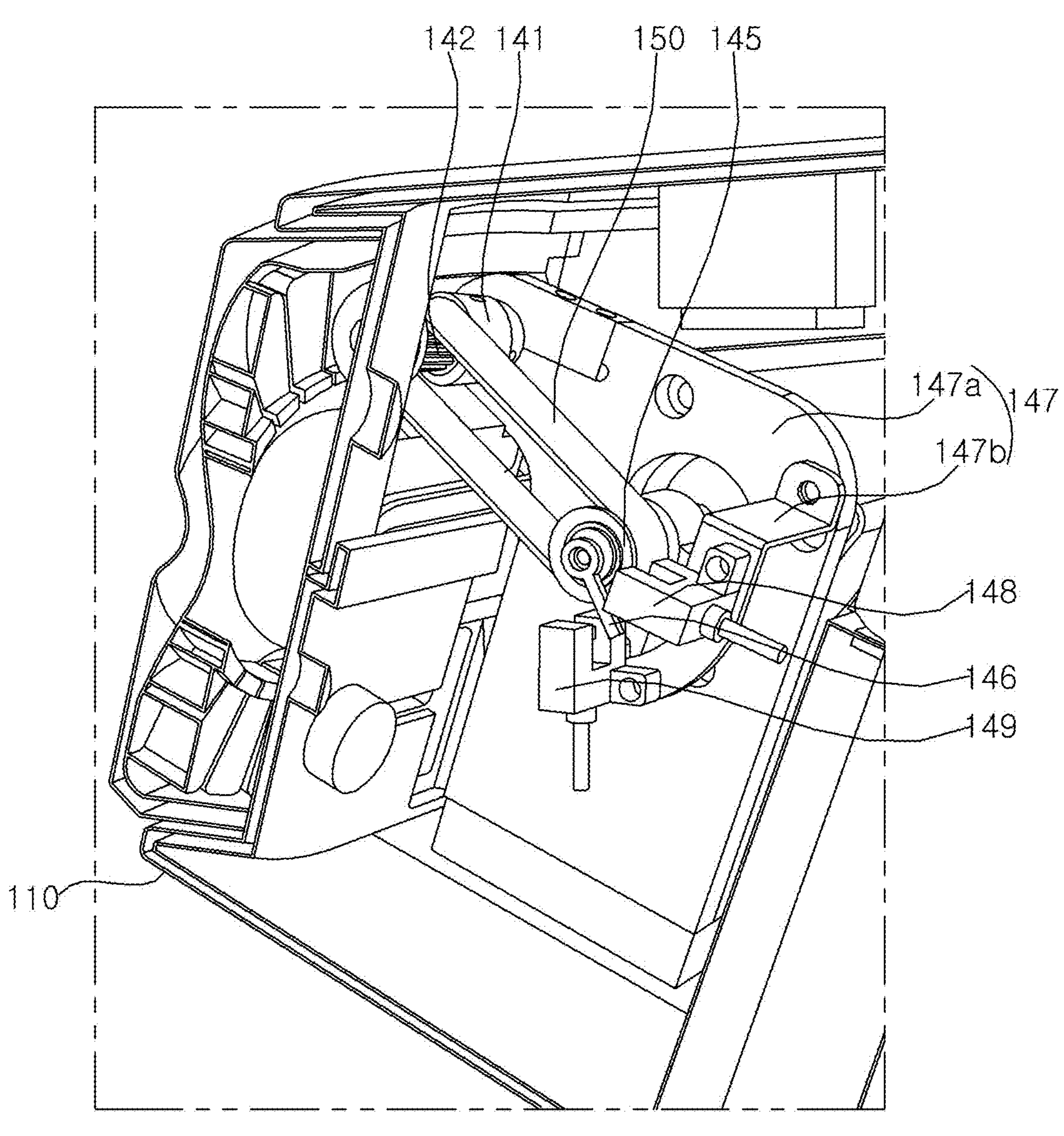

Referring to FIGS. 10 and 11, a bracket 147 may be installed and fixed inside the housing 110. The bracket 147 may include a side bracket 147*a* and a sensor bracket 147*b*. The side bracket 147*a* may be disposed adjacent to the end side of the housing 110. The motor 143 may be mounted on or fixed to the side bracket 147*a*. The transmission pulley (141, 142) may be rotatably coupled to the side bracket 147*a*. The rotating shaft of the motor 143 and the driving pulley (144, 145) may penetrate the side bracket 147*a* through an opening of the side bracket 147*a*. The driving pulley (144, 145) and the transmission pulley (141, 142) may be disposed opposite the motor 143 with respect to the side bracket 147*a*. A belt 150 may connect the driving pulley (144, 145) and the transmission pulley (141, 142), such that as the driving pulley (144, 145) rotates, the transmission pulley (141, 142) may rotate together therewith.

The sensor bracket 147*b* may be coupled or fixed to the side bracket 147*a*. A first sensor 148 may be mounted on the sensor bracket 147*b*, and a second sensor 149 may be mounted on the sensor bracket 147*b* while being spaced apart from the first sensor 148. The second sensor 149, together with the first sensor 148, may be located within the arc of movement of an end of the indicator 146. As the motor 143 rotates, the indicator 146 may pass through the first sensor 148 and the second sensor 149. For example, the sensors 148 and 149 may be photoelectric sensors 148 and 149. An angle of an arc formed by the first sensor 148 and the second sensor 149 may correspond to a rotation angle of the display base 120, thereby detecting whether the display module 130 is at a starting point and an end point of the rotation range.

Figure 12:
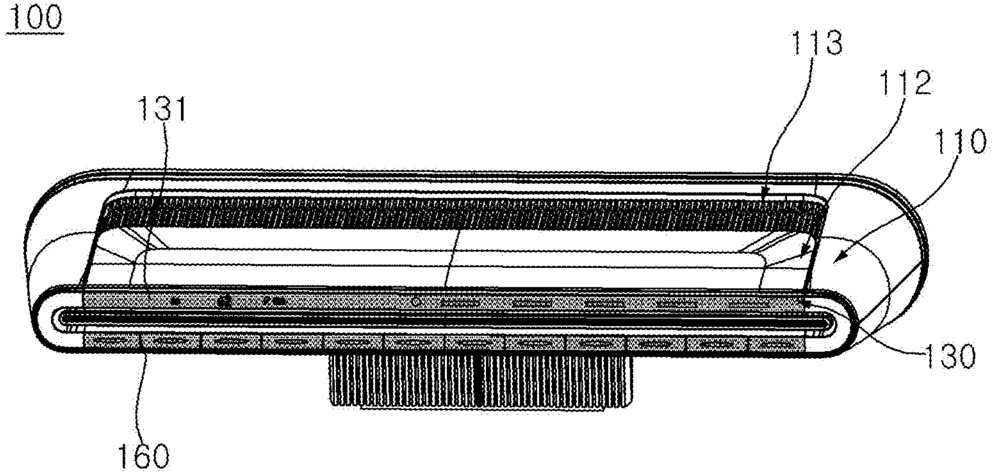
Figure 13:
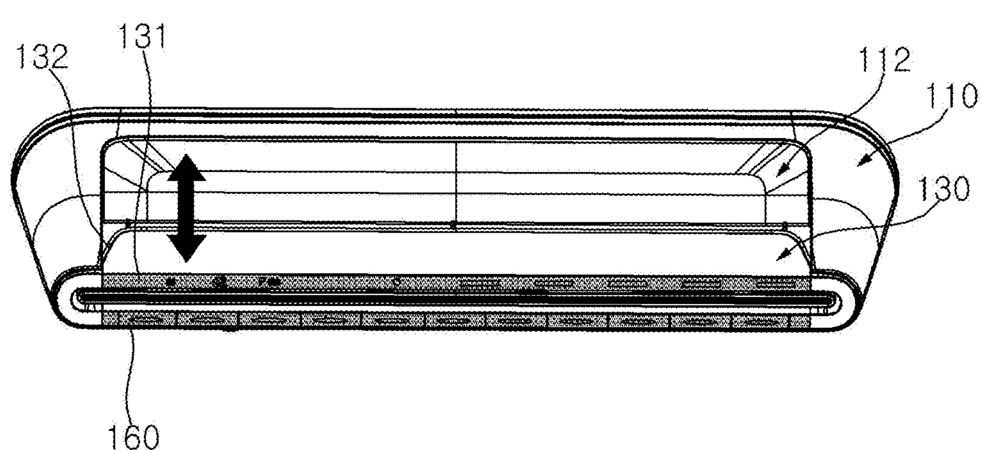

Referring to FIGS. 12 and 13, the first surface 131 of the first display 130 may be exposed to the outside, and the second surface 132 of the first display 130 may be covered by the display cover 112. A second display 160 may be disposed in parallel with the first display 130. The second display 160 may be referred to as a second display module 160. A driver or passenger on board the vehicle can view the first surface 131 of the first display 130 and the second display 160.

The display cover 112 may be movable in a sliding manner. The display cover 112 may open or reveal the second surface 132 of the first display 130. As the second surface 132 of the first display 130 is revealed by the display cover 112, both the first surface 131 and the second surface 132 of the first display 130 may be exposed to the outside.

Figure 14:
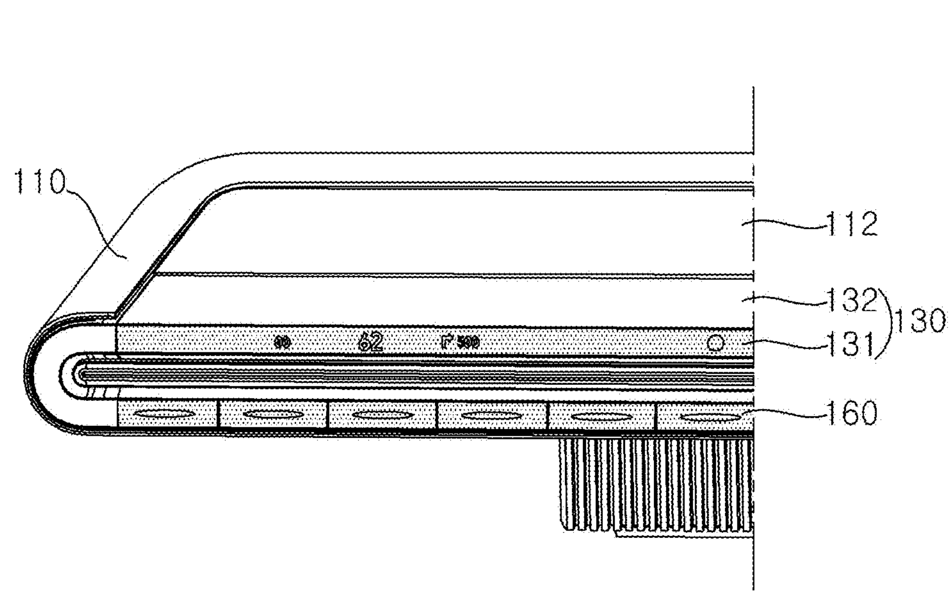

Referring to FIG. 14, the first surface 131 of the first display 130 may display vehicle driving-related information. For example, the first surface 131 of the first display 130 may provide a cluster, a center information display (CID), and a passenger information display (PID).

The first display 130 may display vehicle operating status information. For example, the first surface 131 of the first display 130 may display vehicle speed information, vehicle mileage information, vehicle driving guide information, vehicle's mechanical and electrical status information, etc. As another example, the first surface 131 of the first display 130 may display playback music information, a playlist, image information, search information, etc.

The second display 160 may display option information for vehicle operation. For example, the second display 160 may display setting options for vehicle functions, setting options for vehicle driving characteristics, setting options for a cooling and heating air conditioning system, options for telecommunication settings, setting options for digital maps, etc.

Figure 15:
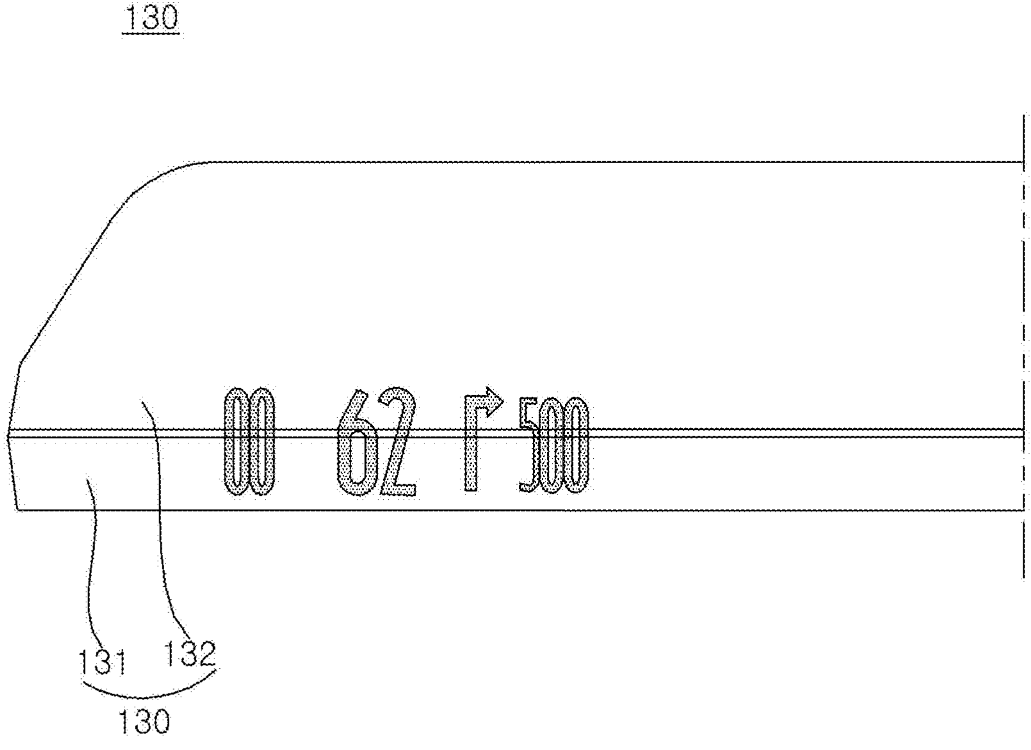
Figure 16:
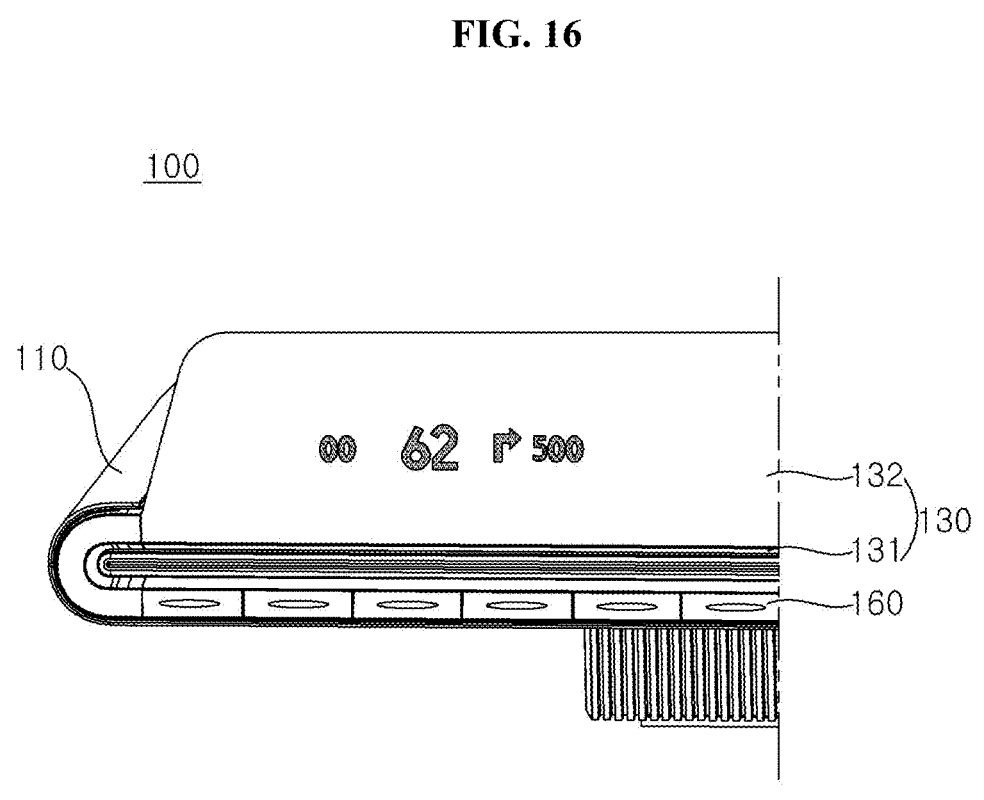

Referring to FIGS. 14 to 16, the first display 130 may be rotatable. When the first display 130 rotates, the first surface 131 may rotate rearward and disappear from the driver's line of sight, and the second surface 132 may rotate forward and pop up in the driver's line of sight. During the rotation of the first display 130, the first display 130 may display information on both the first surface 131 and the second surface 132.

As the first display 130 rotates, information may be displayed at the same viewpoint as the driver. For example, information displayed only on the first surface 131 of the first display 130 may be displayed across the first surface 131 and the second surface 132 as the first display 130 rotates. Further, information displayed both on the first surface 131 and the second surface 132 of the first display 130 may be displayed only on the second surface 132 as the first display 130 rotates. Information may be displayed at the same location relative to the driver's viewpoint, but as the first display 130 rotates, the information may be displayed as a moving image on the first display 130. From the perspective of the first display 130, information may move from the first surface 131 to the second surface 132 as the first display 130 rotates.

Figure 17:
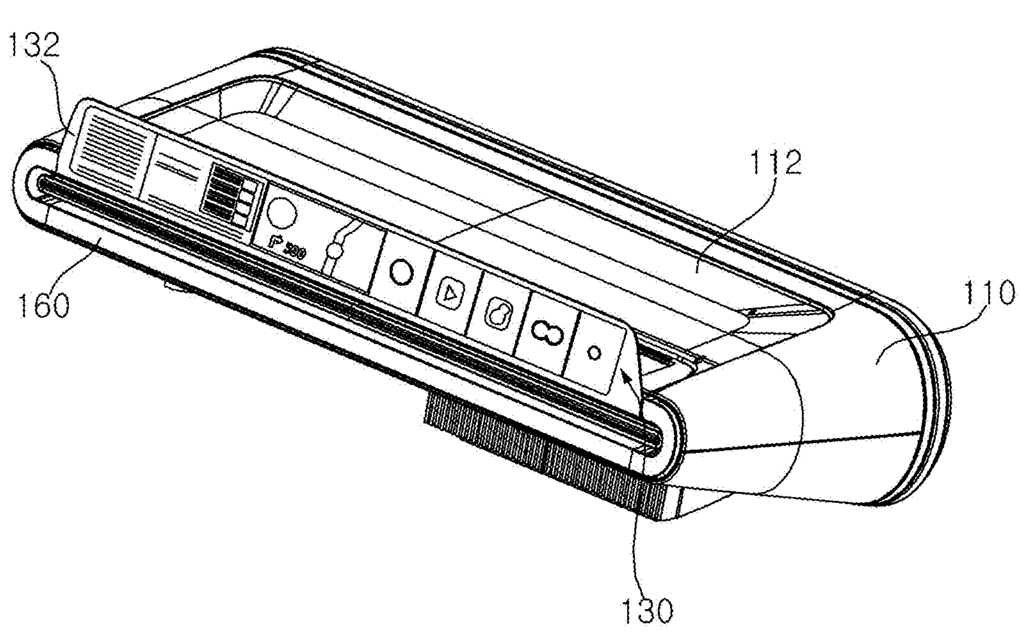

Referring to FIGS. 16 and 17, the second surface 132 of the first display 130 may display driving-related information. For example, the second surface 132 of the first display 130 may provide a cluster, a center information display (CID), and a passenger information display (PID).

The first display 130 may display vehicle operating status information. For example, the second surface 132 of the first display 130 may display vehicle speed information, vehicle mileage information, vehicle driving guide information, vehicle's mechanical and electrical status information, etc. As another example, the second surface 132 of the first display 130 may display playback music information, a playlist, image information, search information, etc.

The second surface 132 of the first display 130 may display option information for vehicle operation. For example, the second surface 132 of the first display 130 may display setting options for vehicle functions, setting options for vehicle driving characteristics, setting options for a cooling and heating air conditioning system, options for telecommunication settings, and setting options for distal maps, etc.

In addition, the second display 160 may display option information for vehicle operation. For example, the second display 160 may display setting options for vehicle functions, setting options for vehicle driving characteristics, setting options for a cooling and heating air conditioning system, options for telecommunication settings, setting options for digital maps, etc. The second display 160 and the first display 130 may display different information by interlocking with each other.

Figure 18:
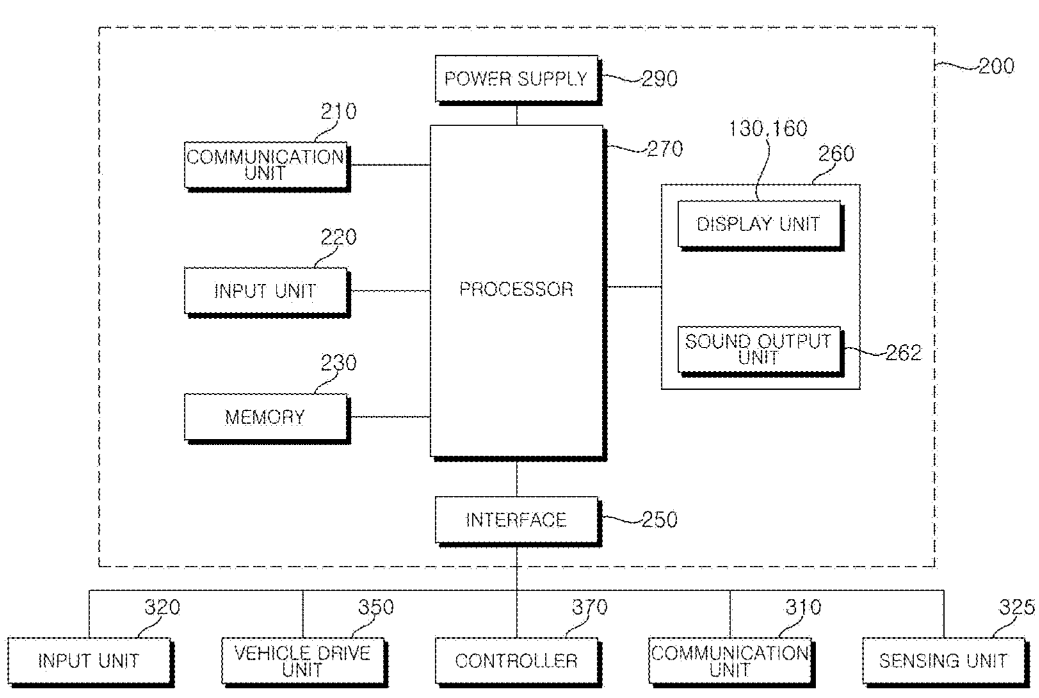

Referring to FIG. 18, a display device 200 for vehicle may include a communication unit 210, an input unit 220, a memory 230, an interface 250, an output unit 260, a processor 270, and a power supply 290. The processor 270 may be referred to as a main controller 270 or a first controller 270.

The communication unit 210 may perform data communication with another device located inside or outside the vehicle. For example, the another device may include at least one of a terminal, a mobile terminal, a server, and another vehicle. The communication unit 210 may include at least one of a V2X communication module, an optical communication module, a location information module, and a short-range communication module.

The input unit 220 may receive various inputs to the display device 200 for vehicle. The input unit 220 may receive a user input to the display device 200 for vehicle. When an ON input to the display device 200 for vehicle is received through the input unit 220, the display device 200 for vehicle may be operated.

The input unit 220 may be electrically connected to the processor 270. The input unit 220 may generate a signal corresponding to the received input and provide the signal to the processor 270. The processor 270 may control the display device 200 for vehicle based on the input to the display device 200 for vehicle received through the input unit 220.

The input unit 220 may receive activation input for various functions of the display device 200 for vehicle. For example, the input unit 220 may receive a setting input for an output manner of the output unit 260.

The input unit 220 may include at least one of a mechanical input device, a touch input device, and a wireless input device. The mechanical input device may include a button, a lever, a jog wheel, a switch, etc. The touch input device may include at least one touch sensor. The touch input device may be configured as a touch screen.

In a state where navigation is output to the touch screen, when a touch input for a specific point of the navigation is received, the processor 270 may generate and output a travel route for the vehicle to travel to the specific point corresponding to the received touch input, or may control the vehicle to autonomously travel to the specific point. The wireless input device may receive a user input wirelessly.

The memory 230 may store a program required for the processor 270 to process or control, various data regarding the operation of the display device 200 for vehicle, and at least one content. The memory 230 may be electrically connected to the processor 270. The processor 270 may control such that various data regarding the operation of the display device 200 for vehicle is stored in the memory 230. The processor 270 may output content stored in the memory 230 to the output unit 260.

The interface 250 may serve as a channel between the display device 200 for vehicle and an external device. The interface 250 may receive various signals or information from the outside or may transmit signals or information provided by the processor 270 to the outside. The interface 250 may be connected to the processor 270, an input unit 320, a vehicle drive unit 350, a controller 370, a communication unit 310, and a sensing unit 325 to perform data communication. The controller 370 may be referred to as a sub-controller 370 or a second controller 370.

The interface 250 may transmit vehicle driving information, provided from at least one of the input unit 320, the vehicle drive unit 350, the controller 370, the communication unit 310, and the sensing unit 325, to the processor 270.

The driving information may include information on at least one of a location of the vehicle, a travel route, a speed, an autonomous driving status, a drive mode, a fuel level, a charging level, a vehicle type, a driver's status, and a time. The drive mode may include an eco mode for fuel efficient driving, a sport mode for spirited driving, and a normal mode.

The interface 250 may provide a signal, provided by the processor 270, to the controller 370 or the vehicle drive unit 350. The signal provided to the controller 370 or the vehicle drive unit 350 may be a signal for controlling the vehicle. The controller 370 may control the vehicle in response to the signal for controlling the vehicle. The vehicle drive unit 350 may be operated in response to the signal for controlling the vehicle.

The output unit 260 may include a display unit 130, 160 to output an image and a sound output unit 262 to output sound. The display 130, 160 or the display module 130, 160 described above may be referred to as the display unit 130, 160.

The display unit 130, 160 may display various graphic objects. The display unit 130, 160 may include a cluster that allows a driver to check vehicle driving information or vehicle status information. The cluster may be positioned on a dashboard. The driver may check information displayed on the cluster while staying focused on the road ahead.

The display unit 130, 160 may be implemented as a head-up display (HUD). When the display unit 130, 160 is implemented as the HUD, information may be output via a transparent display provided on a windshield. Alternatively, the display unit 130, 160 may include a projection module to output information through an image projected onto the windshield.

The transparent display may have a predetermined degree of transparency and display a predetermined screen thereon. The transparent display may include a transparent organic light-emitting diode (OLED) to achieve transparency. The transparency of the transparent display may be adjustable.

The display unit 130, 160 may be inter-layered or integrated with the touch input device included in the input unit 220 to implement a touch screen. The touch screen may function as the input unit 220 that provides an input interface between the display device 200 for vehicle and a user while providing an output interface between the display device 200 for vehicle and the user.

The display unit 130, 160 may include a touch sensor for detecting a touch, so as to receive a control command in a touch manner. When a touch is made on the display unit 130, 160, the touch sensor may detect the touch, and the processor 270 may generate, based on the detected touch, a control command corresponding to the touch. The content input in a touch manner may be characters or numbers, instructions in various modes, or menu items that can be designated.

The display unit 130, 160 may be electrically connected to the processor 270 so as to be controlled by the processor 270. The processor 270 may output an image of the content or a navigation screen through the display unit 130, 160. The navigation, which is an application program for guiding a travel route of the vehicle, may include a screen showing the travel route or voice guidance.

The sound output unit 262 may output sound corresponding to an electrical signal provided by the processor 270. For this purpose, the sound output unit 262 may include a speaker or the like. The processor 270 may output sound of the content or voice guidance of the navigation through the sound output unit 262.

The processor 270 may control the overall operation of each unit in the display device 200 for vehicle. The processor 270 may be electrically connected to the communication unit 210, the input unit 220, the memory 230, the interface 250, the power supply 290, and the output unit 260.

Referring to FIGS. 1 to 18, a display device for a vehicle may include: a housing 110 that is elongated and defines an accommodation space therein; a display base 120 that is elongated in a longitudinal direction of the housing 110 and pivotally coupled to the housing 110 about a longitudinal axis of the housing 110; a display module 130 coupled to the display base 120 so as to rotate together with the display base 120; and a driving module installed in the housing 110 to cause the display base 120 to pivot. The display module 130 may include: a first display surface 131 that is elongated in a longitudinal direction of the display base 120; and a second display surface 132 that is elongated in the longitudinal direction of the display base 120 to be parallel with the first display surface 131, the second display surface 132 being bent and extending from the first display surface 131. A size of the second display surface 132 may be greater than a size of the first display surface 131.

The display module 130 may include: a substrate **130*a* that is transparent and defines the first display surface 131 and the second display surface 132; a display panel 130*c* positioned at a rear of the substrate 130*a*; and an intermediate layer 130*b* disposed between the substrate 130*a* and the display panel 130*c* so as to couple the display panel 130*c* to the substrate 130*a*. The intermediate layer 130*b*** may be made of a transparent material.

The substrate **130*a* may be configured such that the first display surface 131 forms an obtuse angle with the second display surface 132. The display panel 130*c* may be formed in a curved manner. The intermediate layer 130*b* may be in contact with the substrate 130*a* and the display panel 130*c***.

A length L of the first display surface 131 may correspond to a length L of the second display surface 132. A width W2 of the second display surface 132 may be greater than a width W1 of the first display surface 131.

The display device may further include a display cover 112 movably mounted on an upper surface of the housing 110. The display cover 112 may be configured to: cover the second display surface 132 when being adjacent to the first display surface 131; and expose the second display surface 132 when being away from the first display surface 131.

The display device may further include a rotation block 125 that is disposed between the display module 130 and the display base 120 and coupled to the display base 120. The display base 120 may include: a wing plate 121 to support a rear of the second display surface 132; a shaft 122 that is fixed to the wing plate 121 and adjacent to the first display surface 131 to support a rear of the first display surface 131; and a block groove **124*a* recessed into the shaft 122. The rotation block 125 may be inserted into the block groove 124*a***.

The block groove **124*a* may have a through-hole h formed through the shaft 122 of the display base 120. The rotation block 125 may include: a body 125*a* to support the rear of the first display surface 121; a rotating shaft 125*b* provided on the body 125*a*; and a pin 125*c* protruding and extending from the body 125*a*, the pin 125*c*** being inserted into the through-hole h.

The driving module may include: a first pulley (141, 142) coupled to the rotation block 125 to cause the rotation block 125 to rotate; a motor 143 mounted inside the housing 110; a second pulley (144, 145) fixed to a rotating shaft of the motor 143; and a belt 150 to connect the first pulley (141, 142) and the second pulley (144, 145).

The first pulley (141, 142) may include: a pulley shaft 141 coupled to the body **125*a* of the rotation block 125; and a pulley gear 142 on which the belt 150 is wound and rotating together with the pulley shaft 141. The pulley shaft 141 may have an aperture H into which the pin 125*c* of the rotation block 125** is inserted.

The display device may further include a controller 270 electrically connected to the display module 130 so as to control an image provided by the display module 130. The controller 270 may be configured to display an image through at least a portion of the first display surface 131 or the second display surface 132.

When the driving module causes the display module 130 to rotate, the controller 270 may be configured to display the image by moving the image from the first display surface 131 to the second display surface 132 or from the second display surface 132 to the first display surface 131.

The controller 270 may be configured to: enlarge the image in response to the image being moved from the first display surface 131 to the second display surface 132; and reduce the image in response to the image being moved from the second display surface 132 to the first display surface 131.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A display device for a vehicle, the display device comprising:
- a housing;
- a display base extending along the housing, the display base being rotatably coupled to the housing;
- a driving module located in the housing, the driving module being configured to rotate the display base;
- a display module coupled to the display base, the display module being configured to rotate together with the display base, wherein the display module includes:
  - a first display surface extending along the display base; and
  - a second display surface extending along the display base, the second display surface being bent and extending from the first display surface, a size of the second display surface being greater than a size of the first display surface; and
- a display cover movably mounted on an upper surface of the housing, the display cover being configured to move between a first position covering the second display surface and a second position uncovering the second display surface.

2. The display device of claim 1, wherein the display module further includes:
- a substrate including the first display surface and the second display surface, the substrate being transparent;
- a display panel located at a rear of the substrate; and
- an intermediate layer located between the substrate and the display panel so as to couple the display panel to the substrate.

3. The display device of claim 2, wherein the substrate is configured such that a connection between the first display surface and the second display surface provides an obtuse angle,
- wherein the display panel is curved, and
- wherein the intermediate layer contacts the substrate and the display panel.

4. The display device of claim 3, wherein a length of the first display surface corresponds to a length of the second display surface, and
- wherein a width of the second display surface is greater than a width of the first display surface.

5. The display device of claim 1, wherein, when the display cover is in the first position, the display cover is adjacent to the first display surface, and
- wherein, when the display cover is in the second position, the display cover is spaced apart from the first display surface.

6. The display device of claim 1, further comprising a rotation block located between the display module and the display base, the rotation block being coupled to the display base,
- wherein the display base includes:
- a wing plate being configured to support a rear of the second display surface;
- a shaft fixed to the wing plate, the shaft being adjacent to the first display surface, the shaft being configured to support a rear of the first display surface; and
- a block groove recessed into the shaft, and
- wherein the rotation block is configured to be inserted into the block groove.

7. The display device of claim 6, wherein the block groove includes at least one through-hole located through the shaft of the display base, and
- wherein the rotation block includes:
- a body configured to support the rear of the first display surface;
- a rotating shaft located on the body; and
- at least one pin protruding from the body, the at least one pin being configured to be inserted into the at least one through-hole.

8. The display device of claim 7, wherein the driving module comprises:
- a motor located inside the housing, the motor having a rotatable shaft;
- a first pulley fixed to the rotatable shaft of the motor;
- a second pulley coupled to the rotation block, the second pulley being configured to rotate the rotation block; and
- a belt connecting the first pulley and the second pulley, the belt being configured to be driven by rotation of the first pulley, the belt being configured to rotate the second pulley.

9. The display device of claim 8, wherein the second pulley comprises:
- a pulley shaft coupled to the body of the rotation block, the pulley shaft including at least one aperture configured to receive the at least one pin of the rotation block; and
- a pulley gear on which the belt is wound, the pulley gear being configured to rotate together with the pulley shaft.

10. The display device of claim 1, further comprising a controller electrically connected to the display module, the controller being configured to control an image displayed through at least a portion of the first display surface or the second display surface of the display module.

11. The display device of claim 10, wherein, when the driving module causes the display module to rotate, the controller is configured to display the image by moving the image from the first display surface to the second display surface or from the second display surface to the first display surface.

12. The display device of claim 11, wherein the controller is further configured to:
- enlarge a size of the image in response to the image being moved from the first display surface to the second display surface; and reduce a size of the image in response to the image being moved from the second display surface to the first display surface.

13. A vehicle comprising:

a dashboard; and a display device, the display device including:

a housing having a length corresponding to a length of the dashboard;

a display base extending along the housing, the display base being rotatably coupled to the housing;

a driving module located in the housing, the driving module being configured to rotate the display base; and a first display module coupled to the display base, the first display module being configured to rotate together with the display base, the first display module having a length corresponding to a length of the display base, the first display module including:

a first display surface disposed in a first direction; and a second display surface disposed in a second direction different from the first direction, wherein the driving module is configured to rotate at least a portion of the second display surface outside of the housing with respect to a vertical direction.

14. The vehicle of claim 13, wherein the first display surface and the second display surface are fixedly connected to each other.

15. The vehicle of claim 13, wherein the display device further includes a cover coupled to an upper surface of the housing, the cover being configured to cover and uncover the second display surface.

16. The vehicle of claim 13, further comprising a second display module, the second display module being disposed under the first display module with respect to a vertical direction, the second display module having a length corresponding to the length of the first display module.

17. The vehicle of claim 16, wherein the first display module is configured to display different information than the second display module.

18. The vehicle of claim 17, wherein the first display module is configured to display vehicle-driving information, and wherein the second display module is configured to display vehicle-setting information.

* * * * *